Oct. 1, 1968  W. B. WIRTH  3,403,500
BAMBOO RAKES
Filed May 24, 1965  2 Sheets-Sheet 1
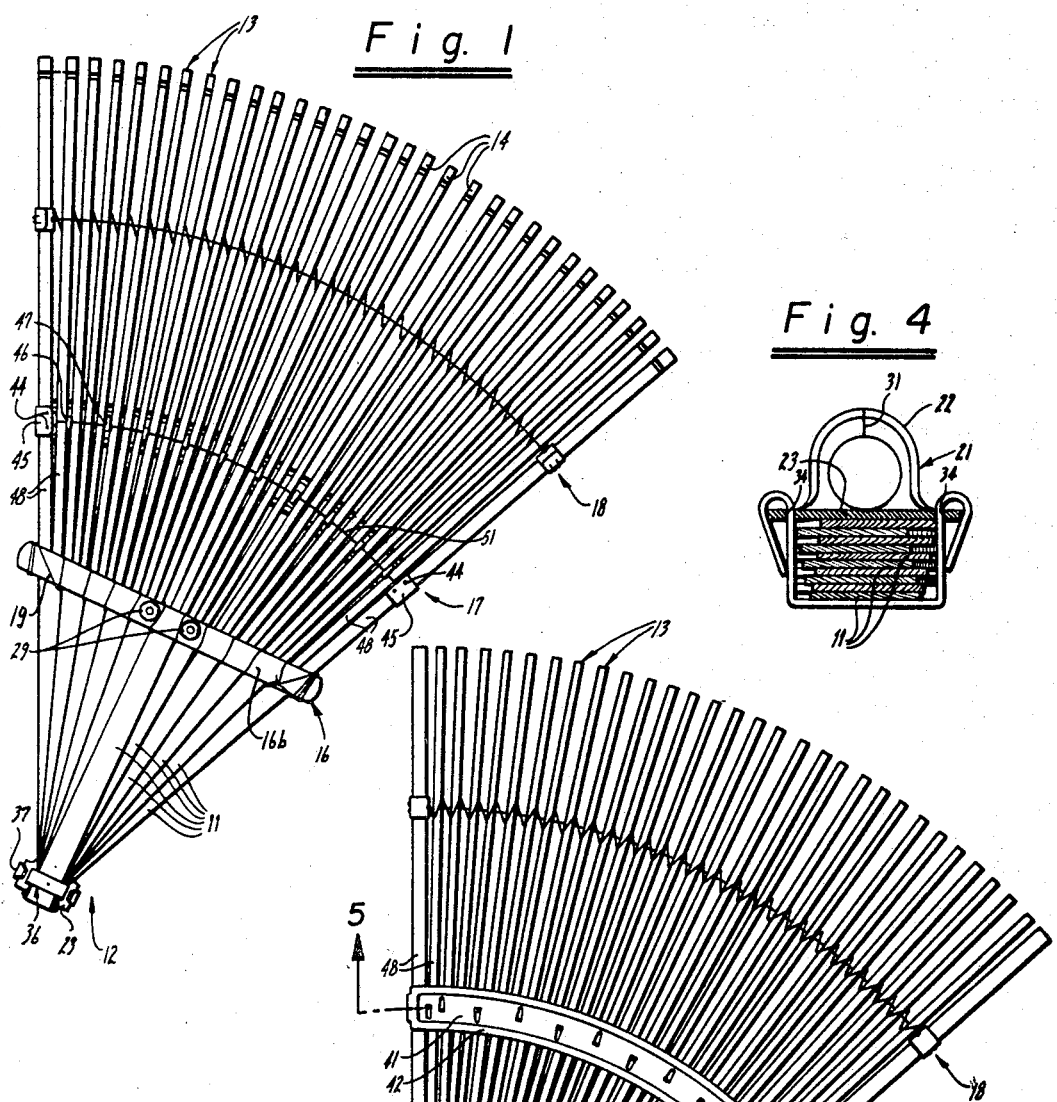
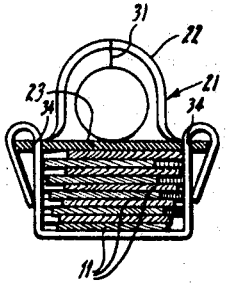
INVENTOR.
Walter B. Wirth
BY
Attorneys Oct. 1, 1968  W. B. WIRTH  3,403,500
BAMBOO RAKES Filed May 24, 1965  2 Sheets-Sheet 2

INVENTOR.
Walter B. Wirth
BY
Attorneys

United States Patent Office 3,403,500
Patented Oct. 1, 1968

3,403,500
BAMBOO RAKES
Walter B. Wirth, 530 S. 11th St.,
Richmond, Calif. 94804
Filed May 24, 1965, Ser. No. 458,089
9 Claims. (Cl. 56—400.17)

ABSTRACT OF THE DISCLOSURE

Bamboo rake assembled with an improved ferrule forming a rigid structure with the upper end of the rake. An improved spreader construction and an improved mounting clip for use with a reinforcing spring are also disclosed.

---

This invention relates to improvements in bamboo rakes of the type used for raking leaves and the like.

As heretofore known, such rakes are constructed of a plurality of bamboo strips grouped together and fastened at one end, fanned out at the other end, and slit intermediate said ends to form a plurality of raking tines. Various methods and devices have been used to secure the cooperation of all the strips and tines, and to correlate this cooperation with that of movements of the handle as effected by the operator. Typically, in handle mounted rakes, the handle is mounted at two points on the rake head; one point being that of where the strips are grouped together and fastened as by a U bolt or a metal strap, and the other on a standard cross piece which spans the strips transversely. This fastening is usually made with a nail, rivet, cotter pin, or the equivalent. It is required that this fastening be made very secure which necessitates that it be best done at the factory. Thus, the handles are mounted to the rake heads and shipped as a complete unit. This requires considerable additional dead cubic space in the shippage and storage.

It is desirable, therefore, that a relatively simple, positive mounting fixture be arranged for a rake which will allow the rake handles to be separately shipped and to be mounted into rake heads by the seller or user in an unskilled manner.

Furthermore, in the past, such mounting of rake handles at two points by nails and the like have permitted relative rotation of the handle with respect to the rake head, especially under conditions of long usage. Such relative movement places considerable undue strain on the parts and lends to impositive action of the raking members, especially when raking in corners, narrow gullies and the like.

There is, therefore, a need for a handle mounting for a rake which will provide that the rake handle is positively secured to the rake and it will not be axially or rotationally movable with respect to the rake head in use.

The positioning of the tines has, in the past, been fixed by a rigid spreader member or comb positioned between the cross member and the outer ends of the tine. The comb serves to rigidly connect each of the tines together and is commonly arched upwardly a slight amount in the center so that the raking end of the tines make uniform contact with a flat surface when the rake is held at an angle to the surface. The spreader member has had a tendency to loosen and slip along the tines and therefore causes them to be relatively inaccurately positioned. Furthermore, the spreader member has been made so that it extends beyond the sides of the outermost tines and presents, therefore, a snag for clothing, etc. When caught, the spreader tends to move and become even more mispositioned.

There is, therefore, a need for an improvement in the spreader which will cause it to maintain its position and which will improve its shape so as to not present a snag. Also, the heretofore known spreader has had but a single reinforcing rib which was constructed to diminish at the ends of the spreader for which reason it does not maintain the tines in good support. There is, therefore, a need for a more thorough reinforcing of the spreader.

Between the raking end of the tines and the spreader member, there is known to dispose additional reinforcing member formed to provide separate pockets for each tine. This member can take the form of a coiled spring, the tines being locked between the cross-loops of the spring by a locking wire positioned under the tines and passing through the bottom of the coiled spring to lock the tines in pockets.

A problem has arisen, however, with respect to the end positioning of this member. Heretofore, C-shaped clips have been used to fasten the wire and spring to the outermost tine. The C-shaped fastener is pressed from the upper and lower sides of the outermost tine. This style of fastener, it has been found, tends to loosen under usage and due to the insufficiency of its holding properties and therefore tends to slip, so that the reinforcing member slips and imperfectly positions the reinforcing spring down to the raking end of the tines.

There is, therefore, a need for an improved clip which will permanently position the ends of the reinforcing spring and wire on the outermost tines.

In general, it is an object of the present invention to provide an improved bamboo rake which overcomes the above named disadvantages and which solves the problems and fills the needs enumerated herein.

Another object of the invention is to provide a bamboo rake of the above character in which novel construction is utilized to obtain improved cooperation between the movements of the rake handle and the rake head.

Additional objects and features of the invention will appear from the following description in which the preferred embodiment is set forth in detail in conjunction with the accompanying drawings of which:

FIGURE 1 is a bottom plan view of a rake constructed according to my invention.

FIGURE 2 is a top plan view of the rake shown in FIGURE 1.

FIGURE 4 is a cross-sectional view of the spreader taken along the lines 4—4 of FIGURE 2.

Figure 5:
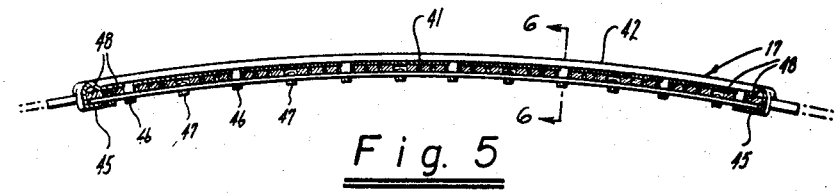
FIGURE 5 is a cross-section view taken through the spreader of the rake as shown in FIGURE 2 and taken along the lines 5—5.

Referring now to the figures, there is shown a bamboo rake which takes the form of conventional fan type bamboo rakes. A plurality of strips 11 are grouped together and fastened at the upper end 12 by wire (not shown) and fanned out therefrom and towards their lower ends 13. The strips are slit intermediate their ends to form a plurality of raking tines 14 at the lower end. As shown, the ends 13 of the tines 14 are bent downwardly to obtain a raking angle with the ground, in use. Three members are positioned intermediate the ends of the rake and across the strip. These members support the rake for cooperative movement of the tines in use and comprise a cross-piece 16, a spreader 17, and a spring reinforcing assembly 18. The cross-piece 16 serves to transmit bending and rotational forces from the handle and is constructed of upper and lower strips 16a and b of semirigid material, such as bamboo, fastened to the strips 11 and together by lacing 19, as shown.

Means is provided for mounting a handle to the rake head and for cooperating with the cross-piece on the rake head to support the strips in a unitary assembly at their upper portions. Such means comprises a ferrule 21 fastened between the ends 12 of the strips and the midportion of the cross-piece 16. The ferrule 21 is constructed from a single sheet of metal which is formed into a central tapered tubular portion 22, and upper and lower mounting tabs 23 and 24. The lower mounting tab 24 extends outwardly and transversely of the tapered tube portion to form a T-shaped structure therewith. The tab 24 is provided with a raised ridge 26 longitudinally and centrally thereon to resist longitudinal bending of the base with respect to the tapered tubular portion 22. The tab 24 is joined to the tubular portion at the back thereof and is buttressed with rib 27 along the sides for further strength. The tab 24 is fastened to the cross-piece 16 at two spaced apart locations which are also spaced apart from the longitudinal axis of the tubular portion 22 so that the handle is supported against rotational movement to the cross-piece 16. The fastening means can be of any type, such as the machines screw 28 and nuts 29 shown, which are fastened through both the cross-pieces 16a and 16b.

The main portion 22 of the ferrule 21 is tapered and tubular and has a slit 31 along the longitudinal upper side thereof so that a certain degree of transverse flexibility of the tube is maintained. The taper of the portion 22 is made that of a standard handle taper and is especially adapted to receive a handle 32 therein as by placing the handle in the ferrule 21 and tapping the opposite end of the handle on the ground so as to drive the rake head and ferrule onto the handle. As the handle moves into the ferrule, the longitudinal slit 31 is opened slightly, and the ferrule 21 thereby grips very firmly onto the handle 32. A pair of nail holes 33 are provided to receive a pin therethrough which can be driven crosswise into the tapered portion of the handle to further secure the same in the ferrule 21.

The upper tab 23 of the ferrule extends longitudinally away from the tapered portion and is provided with a pair of spaced parallel slots 34 therein, the slots being spaced the approximate width of the strips 11 which lie underneath the tab 23. The connection between the tab 23 and the tubular portion of the ferrule is made rigid by the use of ribs 35 which take the form of curved extensions between the upper sides of the tubular portion and the tab. A U-shaped strap 36 is passed upwardly through the slots 34, and the upper parts 37 bent around the sides of the tab 23 so as to securely fasten the ferrule and the end of the strips together. Anti-slip means, such as the projection 38 shown, are provided on the underside of the tab 23 to grip or bite into the uppermost strip to prevent slippage, especially longitudinal slippage of the ferrule with respect to the strips.

Figure 6:
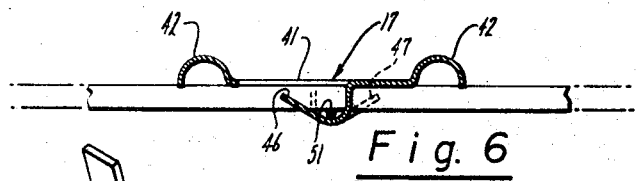
FIGURE 6 is a cross-section view taken along the lines 6—6 of FIGURE 5.

Referring now more particularly to FIGURES 2, 5, and 6, there is shown the spreader 17 constructed according to the invention. The spreader is made of a thin piece of iron sheet formed in a bow shape (FIGURE 5) and semilunar (FIGURE 2) and having a central flat portion 41 and raised ridges 42 about its entire peripheral margin for strength against bending forces. The ends of the spreader are formed into tabs 45 which extend beyond and around the edge of the rake, and are adapted to be bent around the outermost tines to secure the spreader 17 in fixed longitudinal position. The tabs 45 are provided with projections 44 which dig into and engage the outermost tines and on their undersides as the tab is pressed thereabout.

As best shown in FIGURE 6, there is provided a plurality of prongs 46 and 47 which are struck out from the central portion 41 of the spreader and spaced apart in sufficient number to accommodate between them one or more tines, such as the three tines corresponding to each strip. A prong is provided to lie between each of the outermost tines 48. The prongs 46 and 47 are struck out alternately in opposite directions to preserve as much cross-section strength as possible in the spreader and for another reason as will appear from the following discussion.

The spreader 17 is installed on the rake as follows. The tines 14 are spread and laid between the prongs 46 and 47 of the spreader. A locking wire 51 is positioned underneath the tines to extend across the tines and between the ends of the spreader. The tabs 23 are bent around the outside of the outermost tines and pressed down onto the underside of the outermost tine to thereby bury the indents 44 into the tine and thus secure the wire 51 and spreader firmly in place. Then, in one operation, the wire is brought into contact with the underside of the tines and the prongs are pressed over and bent around the wire. Since the prongs overlap the wire in alternately opposite directions, any tendency for the wire to slip out of center is counteracted by that half of the prongs which have their connected ends presented to the wire from that particular side (FIGURE 6).

Figure 7:
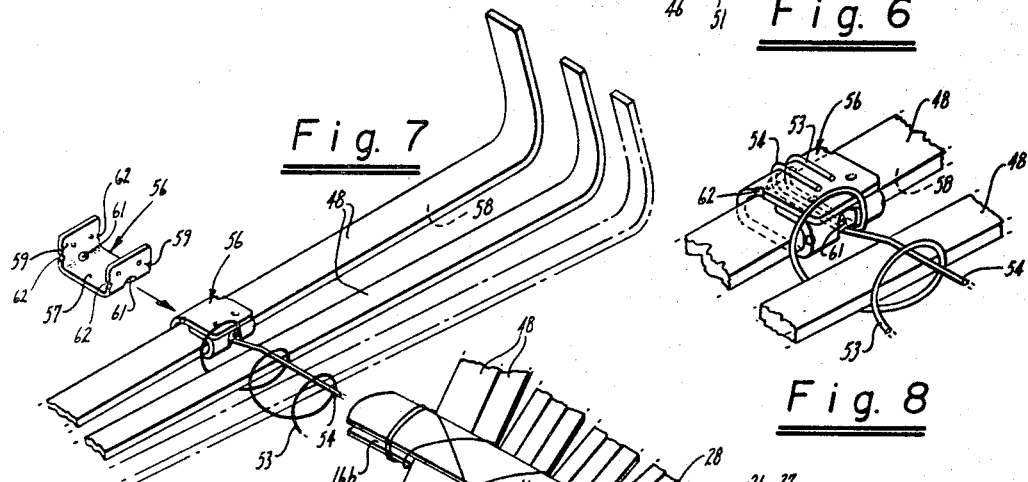
FIGURE 7 is a perspective view of a reinforcing spring mounting clip as constructed according to my invention.
Figure 8:
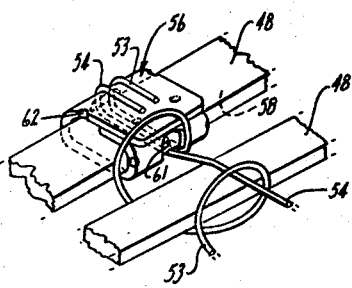
FIGURE 8 is an enlarged perspective view of the wire arrangement within the clip shown in FIGURE 7.
Figure 3:
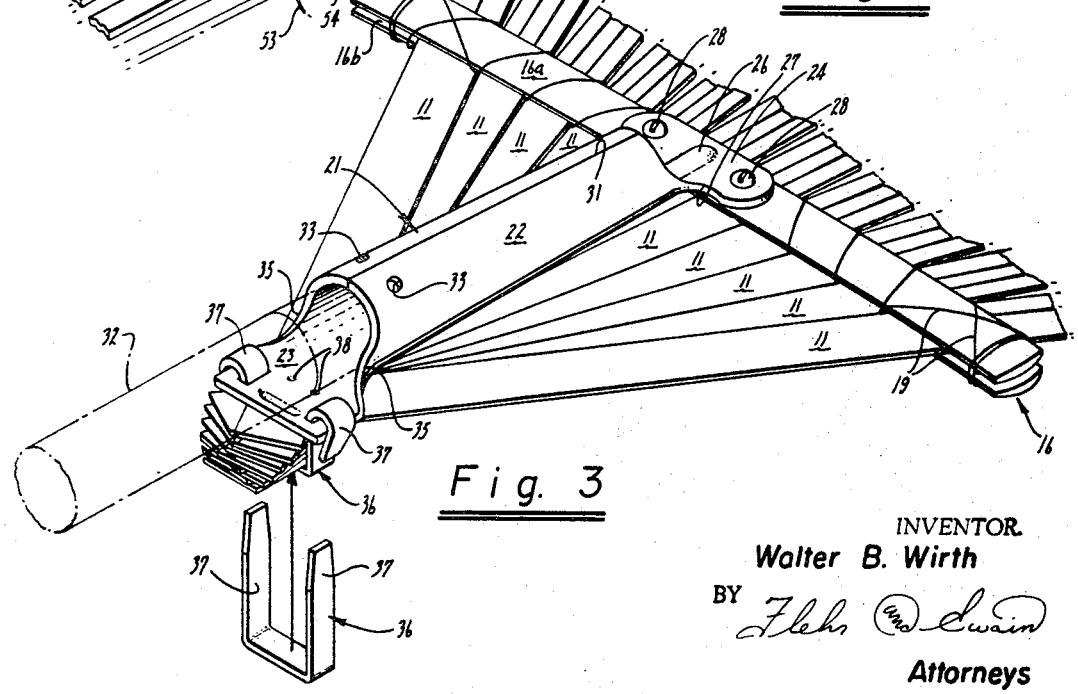
FIGURE 3 is a view in perspective showing a ferrule for mounting a handle to the rake, and constructed according to my invention.

Referring now more particularly to FIGURES 7 and 8, there is provided a coiled separating wire 53 and a locking wire 54 which are secured to the outermost tines 48 by clip members 56. The clip member 56 is made from a flat piece of sheetmetal bent into a substantially U-shaped configuration in cross-section, and having a bottom portion 57 adapted for contact along the upper surface 58 of the outermost tines 48, and upstanding tabs 59 for encircling the tines. The tabs 59 are provided with a plurality of projections stamped therein so that as the tab is bent about the tine the projections penetrate it and fix the clip securely to the tines 48. Midway along the line of connection between the tabs 59 and the bottom portion 57 are provided holes 61 which permit passage of the wires 53 and 54 therethrough. In assembling the rake, the outermost tines are laid top down into the coiled wire, and the locking wire passed along the lower side of the tines and through each cross loop of the coil to thereby lock the tines in place. The coiled wire 53 and the locking wire 54 are brought over the upper side of the outermost tine and passed through the holes 61 in the clip member, into the bottom of which is laid the top of the outermost tines. Then, the inner tab is bent over and pressed into the tine so that the projections bite into it; the other tab and wires 53 and 54 being bent over from the outside and pressed into overlapping relationship over the first ear. To facilitate bending at a distance approximately a thickness of a tine apart from the line of connection between the tabs 59 and the bottom portion 57, there are provided notches 62 for defining a line of weakness therealong.

Thus, I have provided a very positive connection between the wires 53 and 54 and the outer tines. The wires themselves surround the outermost tines and act to resist movement thereof apart from cooperative movement together with the other tines. The clip acts to its full capacity in permanently fixing the position of the wires longitudinally along the tines, it is not being required to transmit significant sideways forces between the wires and the tine.

Further, the construction of the ferrule and its manner of attachment to the strips and cross-piece is such that the tapered portion of the ferrule and the tapered portion of the handle each serve to cooperate with the other to provide a very rigid structure between the upper end of the strips and the cross-piece. Since the handle is easily installed on the rake head, rakes constructed according to my invention can be shipped in two parts (rake heads and handles) to save considerable dead space which is otherwise required for rakes shipped with mounted handles. Furthermore, in the event a handle breaks, it is readily replaceable without disassembling other portions of the rake.

I claim:

1. A bamboo rake comprising a plurality of bamboo strips overlapped and grouped together at their upper ends and fanned out at their lower ends to form a plurality of raking tines, a cross-piece mounted across the strips and secured to the strips intermediate their ends, a rigid ferrule having a rigid tapered tubular portion adapted to receive a handle and extending between the upper ends of the strips and the cross-piece, the lower end of the ferrule having a flat tab portion extending sideways therefrom so that the ferrule is generally T-shaped, means fastening said tab portion to said cross-piece for combining the ferrule and cross-piece into a rigid structure, the upper end of the ferrule terminating in a clamp portion which engages the upper ends of the tines and forms part of a clamp for securing the upper ends of the tines, means secured to said clamp portion and engaging the upper ends of the strips for fastening the upper ends of the strips to the ferrule and for rigidly interconnecting the upper ends of the strips to the ferrule.

2. A bamboo rake as in claim 1 in which said tapered tubular portion is slit longitudinally therealong so that it can open slightly and tightly grip a handle having a correspondingly tapered end.

3. A bamboo rake as in claim 1 in which said tab portion is provided with a raised ridge longitudinally therealong to resist longitudinal bending of the tab with respect to the tapered tubular portion.

4. A bamboo rake as in claim 1 in which the mounting means for fastening the upper end of the ferrule comprises a tab extending longitudinally upwardly from the tapered tubular portion of the ferrule, said tab including a pair of spaced parallel slots spaced apart to lie alongside the upper end of the strips, and a U-shaped strap mounted to encircle the upper ends of the strips and to pass through said slots, the ends of the strap extending upwardly and beyond said tab and being bent thereabout to fasten said ferrule to the upper end of the strips.

5. A bamboo rake as in claim 4 in which said tab is provided with projections on its underside for biting into the end of the uppermost strip to thereby prevent the ferrule from slipping.

6. A bamboo rake comprising a plurality of bamboo strips overlapped and grouped together at their upper ends and fanned out at their lower ends to form a plurality of raking tines, a cross-piece mounted across said strips and secured to the strips intermediate their ends, a rigid ferrule including a rigid tapered tube adapted to receive a handle and extending between the upper ends of the strips and the cross-piece, the lower end of the ferrule having a flat tab extending sidewise therefrom and forming a T-shaped structure, means fastening said tab to said cross-piece for combining the ferrule and cross-piece into a rigid structure, means associated with the upper end of the ferrule for fastening the same to the upper ends of the strips and for maintaining the upper ends rigidly connected together, a tine spreader mounted on the tines intermediate the cross-piece and the lower ends of the tines, said spreader comprising a flat plate positioned on the top side of said tines and having a raised ridge encircling its entire peripheral margin for strength against bending forces, said spreader being provided with a plurality of prongs struck out of said plate to depend downwardly therefrom and adapted to pass between groups of tines of each strip, and a retaining wire secured under the tines by said prongs, said prongs being bent over the retaining wire in alternate directions with respect to the long dimension of the tines so that any tendency for the retaining wire to slip out of the center is resisted by those prongs having their connected ends presented to the retaining wire.

7. A rake as in claim 6 in which said spreader is provided with tabs bent around the outside of the outermost tine on each side and to grip the underside of the tine and to fasten together the tine, the locking wire and the spreader, said tabs having indent means projecting therefrom for frictionally engaging the undersides of the tines they engage.

8. A rake as in claim 6 further including a wire coil reinforcing means mounted across the tines, intermediate the spreader and the raking end of the tines, said coil reinforcing means having a plurality of loops, a retaining wire, each tine being positioned and held between adjacent ones of said loops by said retaining wire, said reinforcing means and retaining wire being fastened to the outermost tine on each side by an improved clip, said clip being formed in a U-shape and having a bottom portion and a tab portion, with other portions thereof being relieved to permit the ends of the reinforcing means and retaining wire to pass between the clip and the outermost tine on each side, said tab portions, said ends of the wire, and the ends of the coil reinforcing means being bent over the outermost tine on each side to secure the clips, the coil reinforcing means and the retaining wire together.

9. A bamboo rake as in claim 8 in which the clip is provided with projections on the interior thereof for frictionally engaging the tine.

References Cited

UNITED STATES PATENTS

| | | | |
|---|---|---|---|
| 1,978,295 | 10/1934 | Dennis | 56—400.17 |
| 1,989,815 | 2/1935 | McGuire | 56—400.17 |
| 2,018,311 | 10/1935 | McGuire | 56—400.17 |
| 2,365,393 | 12/1944 | Connolly | 56—400.17 |
| 2,847,816 | 8/1958 | Yeda | 56—400.17 |
| 3,078,652 | 2/1963 | Simmons | 56—400.17 |

ABRAHAM G. STONE, *Primary Examiner.*

P. A. RAZZANO, *Assistant Examiner.*